Patented Nov. 14, 1922.

1,435,801

UNITED STATES PATENT OFFICE.

ALEXANDER BLUMFELDT, OF NEUE WELT-MUNCHENSTEIN, NEAR BASEL, SWITZERLAND, ASSIGNOR TO SOCIETY OF CHEMICAL INDUSTRY IN BASLE, OF BASEL, SWITZERLAND.

RESIN AND PROCESS OF MAKING SAME.

No Drawing. Application filed June 13, 1921. Serial No. 477,255.

*To all whom it may concern:*

Be it known that I, ALEXANDER BLUMFELDT, a citizen of the Swiss Republic, and resident of Neue Welt-Munchenstein, near Basel, Switzerland, have invented new and useful Resins and Processes of Making Same, of which the following is a full, clear, and exact specification.

It is known, that aromatic compounds react easily with sulfur and alkali sulfides, giving products capable of being employed as dyestuffs or being technically valuable owing to their other physical or chemical properties.

According to the process of the present invention phenols as ordinary phenol, cresoles, etc., are heated with sulfur in presence of basic reacting substances, whereby a resin is produced which is transformed by heat or by heat and pressure into a body infusible and insoluble in the organic solvents as for instance alcohol, acetone, phenol, etc.

The new technical and economical effect of the invention consists in the fact that a resin can be produced, which possesses all advantages of the formaldehyde-phenol-resins capable of being hardened, of the bakelite type, but contains instead of the expensive methylen groups the cheap and heavier sulfur radicals.

The end of the reaction is perceptibly attained, when the development of hydrogen sulfide ceases. The proportions of phenol and of sulfur employed can be varied within certain limits. For the preparation of resins able to be hardened a suitable proportion is about 2 to 3 molecules of sulfur for 1 molecule of phenol or cresol, nearly 1 to 1.5 molecules of sulfur escaping as hydrogen sulfide. When the reaction is duly terminated, such a resin contains nearly 1 to 1.5 molecules of sulfur for 1 molecule of phenol or cresol. But the resin is capable of taking up still important quantities of sulfur and of alkali sulfides as filling materials (fillers). The proof of the presence of uncombined sulfur can be made by acidifying feebly the alcoholic solution, whereby the sulfur not chemically bound is precipitated; it can also be determined purely physically by the green coloration of the resin, since the resins without free sulfur show a yellow to red-brown coloration.

The alkalinity necessary for the reaction is advantageously set in with a weight of a base which is, at best, capable of transforming $\frac{1}{5}$ of the quantity of phenol employed into a phenolate. Within these limits the quantity of alkali can be varied.

In order to accelerate the reaction catalysts can be added to the reaction mixture. As catalysts there can be employed halogens or halogen compounds of sulfur, of selenium, of antimony, of arsenic, of bismuth or generally of the metalloids. An excess of basic compounds, which after the achievement of the reaction can be removed by steam or by washing with water or can be neutralized by an acid, acts particularly favorably as agent accelerating the reaction, the salts formed being in the latter case subsequently separated by filtration from the alcoholic solution of resin.

It has further been found that a peculiar hardening of the sulfuretted-resins obtained according to the present process can be produced by an addition of little quantities of formaldehyde or of compounds capable of splitting off formaldehyde, as for instance, hexamethylentetramine. This proceeding is particularly suitable, when large moulded pieces of resin shall be converted under pressure into the hardened state, whereby it may be desirable to effect the final polymerization for hygienical reasons as scentless as possible, that is to say without splitting off of hydrogen sulfide.

Owing to their lack of any smell, their adhesive power, their solubility, their light coloration, their fusibility and finally their property of being transformed by heat and pressure into infusible and insoluble bodies, the resins are appropriate to be employed in all industries using resins and lacs and particularly by reason of their isolating properties in the electro-technical industry.

*Example 1.*

47 kg. of phenol and 36 kg. of sulfur are melted in a vessel provided with a reflux cooler and to the molten mass is added 1 kg. of potassium hydrosulfide (KHS). The reaction mixture is heated advantageously, while stirring, to about 130–140° C., whereby the reaction begins with an abundant and regular evolution of hydrogen sulfide. The reaction proceeds at a progressively rising temperature, while the abundant and regular evolution of hydrogen sulfide continues. In accordance with the degree of action of the stirrer and with the temperature, the time of the reaction can vary within wide limits. In favorable cases, the end of the reaction, perceivable by the cessation of the evolution of hydrogen sulfide, can be attained already after a few hours. The quantity of the hydrogen sulfide evolved amounts about to the half of the employed sulfur. The molten mass originally green and moderately fluid is transformed at the end of the reaction into a reddish-brown, very viscous, adhesive, fluid mass, which can be further concentrated until a sample solidifies by cooling to a hard brittle resin. The fluid resin is poured into tin-moulds and can after cooling be removed therefrom in the form of blocks or of sheets or plates.

In this state the resin is easily soluble in alcohol, acetone, benzene and alkalies, but insoluble in acids and aliphatic hydrocarbons and their derivatives. The resin has the property of being transformed, when heated for some time at 150 to 180° C., especially under pressure, into an infusible product insoluble in the organic solvents as for instance alcohol, acetone, phenol, etc. It does not lose this property, even when the most various filling materials (fillers) are added thereto or when it is applied in a thin layer as lac. The resin is nearly scentless and is advantageously distinguished from analogous resins produced with formaldehyde.

Example 2.

54 kg. of cresol are treated with 32 kg. of sulfur and 5 kg. of potash, as above specified. The reaction begins with a voluminous foaming and is terminated after a short time. The resulting resin is of somewhat greenish tint, as a part of sulfur is still contained in the resin in a not combined state. The solubility and the fusibility are the same as in example 1. By means of acetic acid the not combined sulfur can be precipitated and thus a resin of red-brown coloration can be obtained as in example 1.

Example 3.

24 kg. of phenol and 27 kg. of cresol are treated with 27 kg. of sulfur and with 1000 gr. of aniline, to which about 10 gr. of iodine were previously added, as specified in example 1, at 130 to 140° C. After some hours the development of hydrogen sulfide is terminated and the fluid resin can be further concentrated or be removed from the reaction vessel as a less hard resin. This resin is also capable of being transformed into an infusible and insoluble product.

Example 4.

To a resin prepared according to example 1 from 47 kg. of phenol, 32 kg. of sulfur and about 1 kg. of potassium hydrosulfide are added, after cooling of the molten mass, nevertheless at a temperature at which the completely sulfuretted resin is still melted, about 5 per cent of its weight, that is to say, about 3 kg. of hexamethylentetramine, as such or in form of a concentrated aqueous solution, at a temperature not above 114° C. As the temperature rises easily and the final polymerization could thereby be produced, what does not be desirable at this stage, care must be taken that the reaction between the resin and the hexamethylentetramine is delayed by a lowering of temperature in order that this reaction takes only place in the mould employed for the preparation of hardened moulded products.

What I claim is:—

1. The herein described process for the manufacture of new resins, capable of being transformed by heat or heat and pressure into bodies infusible and insoluble in the organic solvents, consisting in heating phenols with sulfur in presence of a quantity of basic substances not higher, than one fifth of that which would be necessary for neutralizing the phenols employed.

2. The herein described process for the manufacture of new resins, capable of being transformed by heat or heat and pressure into bodies infusible and insoluble in the organic solvents, consisting in heating phenols with sulfur in presence of a catalyst and of a quantity of basic substances not higher than one fifth of that which would be necessary for neutralizing the phenols employed.

3. The herein described process for the manufacture of new resins, capable of being transformed by heat or heat and pressure into bodies infusible and insoluble in the organic solvents, consisting in heating phenols with sulfur in presence of a halogen and of a quantity of basic substances not higher than one fifth of that which would be necessary for neutralizing the phenols employed.

4. The herein described process for the manufacture of new resins, capable of being transformed by heat or heat and pressure into bodies infusible and insoluble in the organic solvents, consisting in heating phenols with sulfur in presence of a halogen compound and of a quantity of basic substances not higher than one fifth of that which would be necessary for neutralizing the phenols employed.

5. The herein described process for the manufacture of new resins, capable of being transformed by heat or heat and pressure into bodies infusible and insoluble in the organic solvents, consisting in heating phenols with sulfur in presence of basic substances in a quantity not higher than one fifth of that which would be necessary for neutralizing the phenols employed and in adding to the mass of reaction a small quantity of formaldehyde or of a substance capable of splitting off formaldehyde.

6. As new products the herein described resins, which contain at least one sulfuretted product resulting from the action of sulphur on a phenol and are easily soluble in alcohol, acetone, benzene and alkalies, insoluble in acids and aliphatic hydrocarbons and their halogen derivatives, possess a strong adhesive power, are nearly scentless and light-colored in a thin layer, and are capable of being transformed by heating at 150 to 180° C. for some time, particularly under pressure, into products infusible and insoluble in the organic solvents.

In witness whereof I have hereunto signed my name this first day of June 1921, in the presence of two subscribing witnesses.

Dr. ALEXANDER BLUMFELDT.

Witnesses:
 FRIEDA ROSS,
 AMAND BAUM.